(12) United States Patent
Lyden et al.

(10) Patent No.: US 8,228,017 B2
(45) Date of Patent: Jul. 24, 2012

(54) CONTROL TECHNIQUES FOR MOTOR DRIVEN SYSTEMS

(75) Inventors: Colin Lyden, Baltimore (IE); Javier Calpe-Maravilla, Algemesi (ES); Mark Murphy, Kilmore (IE); Eoin English, Pallasgreen (IE); Denis O'Connor, Banteer (IE)

(73) Assignee: Analog Devices, Inc., Norwood, MA (US)

( * ) Notice: Subject to any disclaimer, the term of this patent is extended or adjusted under 35 U.S.C. 154(b) by 498 days.

(21) Appl. No.: 12/555,936

(22) Filed: Sep. 9, 2009

(65) Prior Publication Data

US 2010/0202069 A1    Aug. 12, 2010

Related U.S. Application Data

(63) Continuation-in-part of application No. 12/367,883, filed on Feb. 9, 2009, and a continuation-in-part of application No. 12/367,938, filed on Feb. 9, 2009, now abandoned.

(60) Provisional application No. 61/150,958, filed on Feb. 9, 2009.

(51) Int. Cl.
| | |
|---|---|
| G05B 11/01 | (2006.01) |
| H02K 7/02 | (2006.01) |
| G06F 3/033 | (2006.01) |
| G06F 3/041 | (2006.01) |
| G02B 13/16 | (2006.01) |
| G11B 5/596 | (2006.01) |
| G11B 5/09 | (2006.01) |
| G11B 7/00 | (2006.01) |

(52) U.S. Cl. ........ 318/629; 318/161; 345/161; 345/173; 348/335; 360/77.02; 360/46; 369/44.15; 369/44.19

(58) Field of Classification Search .................. 318/161, 318/629; 345/161, 173; 348/335; 360/46, 360/77.02; 369/44.15, 44.19
See application file for complete search history.

(56) References Cited

U.S. PATENT DOCUMENTS 4,477,755 A * 10/1984 Rickert .................. 318/611
(Continued)

FOREIGN PATENT DOCUMENTS

WO    2009/116453 A1    9/2009

OTHER PUBLICATIONS

PCT International Search Report for PCT/US2010/022117 mailed on Dec. 8, 2011.
(Continued)

Primary Examiner — Walter Benson
Assistant Examiner — Gabriel Agared
(74) Attorney, Agent, or Firm — Kenyon & Kenyon LLP

(57) ABSTRACT

A drive signal for a motor-driven mechanical system has zero (or near zero) energy at an expected resonant frequency of the mechanical system. The drive signal may be provided in a series of steps according to a selected row of Pascal's triangle, wherein the number of steps equals the number of entries from the selected row of Pascal's triangle, each step has a step size corresponding to a respective entry of the selected row of Pascal's triangle, and the steps are spaced from each other according to a time constant determined by an expected resonant frequency of the mechanical system. Alternatively, the stepped drive signal may be provided as a series of uniform steps according to a selected row of Pascal's triangle, in which the steps are provided in a number of spaced intervals corresponding to the number of entries from the selected row of Pascal's triangle, each interval includes a number of steps corresponding to a respective entry from the selected row of Pascal's triangle and the intervals are spaced in time according to a time constant determined from the expected resonant frequency of the mechanical system. These techniques not only generate a drive signal with substantially no energy at the expected resonant frequency, they provide a zero-energy "notch" of sufficient width to tolerate systems in which the actual resonant frequency differs from the expected resonant frequencies.

24 Claims, 13 Drawing Sheets

U.S. PATENT DOCUMENTS

| | | | |
|---|---|---|---|
| 4,649,328 A | | 3/1987 | Leonard et al. |
| 4,761,774 A | * | 8/1988 | Ishibashi et al. ........... 369/44.19 |
| 5,736,824 A | | 4/1998 | Sato et al. |
| 5,786,678 A | | 7/1998 | Kobayashi et al. |
| 7,031,094 B2 | * | 4/2006 | Chung ............................ 360/75 |
| 7,068,923 B2 | * | 6/2006 | Miyazaki ...................... 388/806 |
| 7,501,616 B2 | * | 3/2009 | Wiklof .......................... 250/234 |
| 7,639,232 B2 | | 12/2009 | Grant et al. |
| 2003/0133218 A1 | * | 7/2003 | Guo et al. ....................... 360/75 |
| 2005/0134562 A1 | * | 6/2005 | Grant et al. ................... 345/161 |
| 2007/0019321 A1 | | 1/2007 | Kim et al. |
| 2008/0062143 A1 | * | 3/2008 | Shahoian et al. ............. 345/173 |
| 2008/0158406 A1 | * | 7/2008 | Ito ................................. 348/335 |

OTHER PUBLICATIONS

Partial International Search Report mailed May 2, 2012, for PCT International Application No. PCT/US2010/022110.

* cited by examiner

RESPONSE OF
MECHANICAL SYSTEM

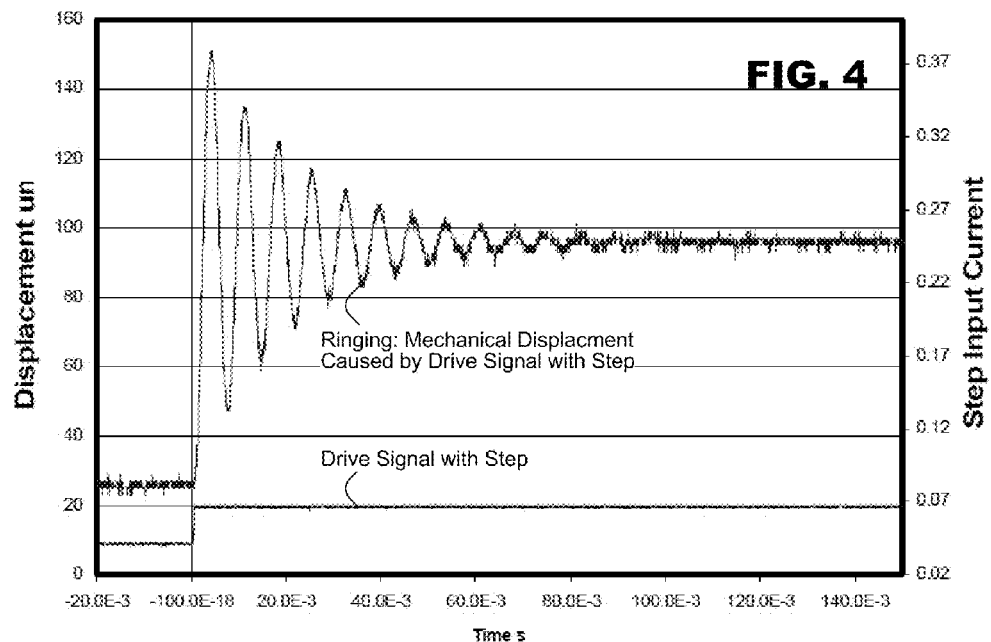
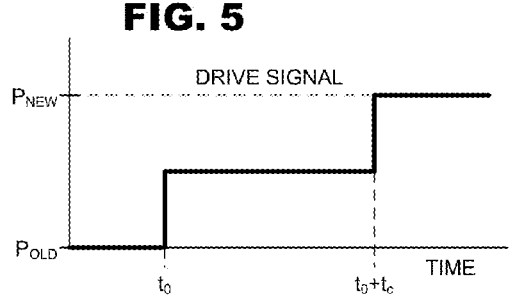
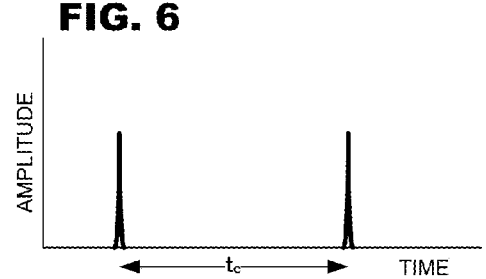
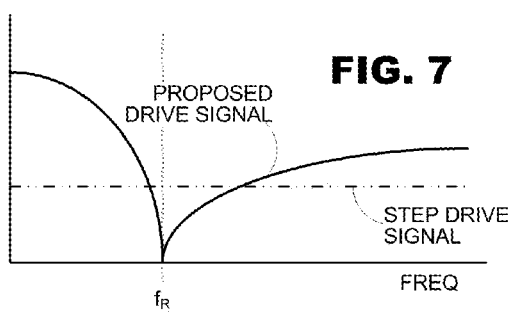

1600

1700

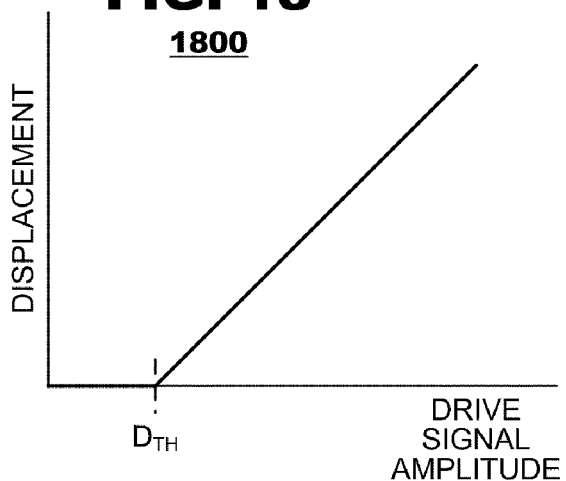
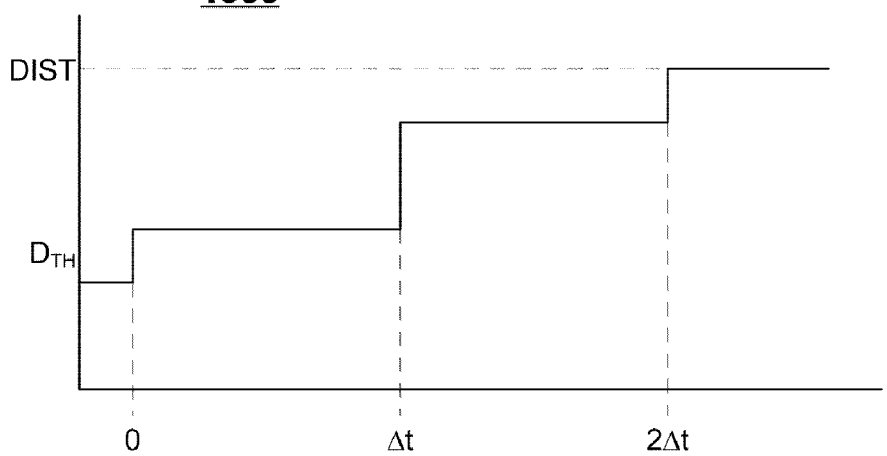

2000

2100

2200

2300

2400

2500

CONTROL TECHNIQUES FOR MOTOR DRIVEN SYSTEMS

RELATED APPLICATION

This application claims the benefit of priority from United States provisional application "Control Protocols for Motor-Driven Mechanical Systems", Ser. No. 61/150,958, filed Feb. 9, 2009 the disclosure of which is incorporated herein by reference in its entirety.

This application is a continuation-in-part of co-pending applications "Control Techniques for Motor Driven Systems" having Ser. Nos. 12/367,883 and 12/367,938, both filed on Feb. 9, 2009, the disclosures of which are incorporated herein by reference in their entirety.

BACKGROUND

The present invention relates to motor control and control of motor driven systems. In particular, it relates to control of motor driven systems that minimize ringing or 'bounce' in the mechanical systems that are under motor control.

Motor driven translational systems are commonplace in modern electrical devices. They are used when it is necessary to move a mechanical system within a predetermined range of motion under electrical control. Common examples can include autofocus systems for digital cameras, video recorders, portable devices having such functionality (e.g., mobile phones, personal digital assistants and hand-held gaming systems) and laser drivers for optical disc readers. In such systems, a motor driver integrated circuit generates a multi-value drive signal to a motor which, in turn, drives a mechanical system (e.g. a lens assembly, in the case of an auto-focus system). The motor driver generates the drive signal in response to an externally supplied codeword. The code word often is a digital value that identifies a location within the mechanical system's range of motion to which the motor should move the mechanical system. Thus, the range of motion is divided into a predetermined number of addressable locations (called "points" herein) according to the number of code words allocated to the range of motion. The drive signal is an electrical signal that is applied directly to the motor to cause the mechanical system to move as required.

Although the types and configurations of the mechanical systems typically vary, many mechanical systems can be modeled as a mass coupled to a spring. When a motor moves the mass according to the drive signal, the motion generates other forces within the system which can cause the mass to oscillate around the new location at some resonant frequency ($f_R$). For example, resonant frequencies of approximately 110 Hz have been observed in consumer electronic products. Such oscillation typically diminishes over time but it can impair performance of the device in its intended function by, for example, extending the amount of time that a camera lens system takes to focus an image or the time a disk reader takes to move to a selected track.

FIG. 1 is a simplified block diagram of a motor-driven system commonly used in lens drivers. The system includes an imaging chip 110, a motor driver 120, a voice coil motor 130 and a lens 140. The motor driver generates a drive signal to the voice coil motor in response to a code provided by the imaging chip. In turn, the voice coil motor moves the lens within its range of motion. Movement of the lens changes the way the lens focuses incoming light on a surface of the imaging chip, which can be detected and used to generate new codes to the motor driver. FIG. 2 is a frequency plot of possible response of the system of FIG. 1, illustrating a resonant frequency at frequency $f_R$.

FIG. 3 illustrates two drive signals generated by conventional motor drivers. A first drive signal is a step function, that changes from a first state to a second state as a discontinuous jump (FIG. 3(a)). The second illustrated drive signal is a ramp function that changes from the first state to the second state at a fixed rate of change (FIG. 3(b)). Both types of drive signals, however, cause the ringing behavior that impairs performance as noted above. FIG. 4, for example, illustrates ringing observed in one such mechanical system.

The inventors have observed that the ringing behavior of such motor-driven systems unnecessarily extends the settling times of such mechanical systems and degrades performance. Accordingly, there is a need in the art for such motor-driven systems that can be driven according to a digital codeword and avoids the oscillatory behavior noted in these systems.

BRIEF DESCRIPTION OF THE DRAWINGS

FIG. 4 illustrates response of a mechanical system observed under a unitary step drive signal.

FIG. 5 illustrates a drive signal according to an embodiment of the present invention.

FIG. 6 is a graph illustrating height and position of the drive signal of FIG. 5.

FIG. 7 is a graph illustrating energy distribution by frequency of a drive signal of the present invention.

FIG. 18 is an exemplary graph illustrating typical displacement of a mechanical system (after settling) versus an applied drive signal.

FIG. 19 is a graph illustrating an exemplary drive signal according to a further embodiment of the present invention.

DETAILED DESCRIPTION

Embodiments of the present invention provide a drive signal for a motor-driven mechanical system whose frequency distribution has zero (or near zero) energy at the expected resonant frequency of the mechanical system. The drive signal may be provided in a series of steps according to a selected row of Pascal's triangle, wherein the number of steps equals the number of entries from the selected row of Pascal's triangle, each step has a step size corresponding to a respective entry of the selected row of Pascal's triangle, and the steps are spaced from each other according to a time constant determined by an expected resonant frequency of the mechanical system. Alternatively, the stepped drive signal may be provided as a series of uniform steps according to a selected row of Pascal's triangle, in which the steps are spaced into a number of intervals corresponding to the number of entries from the selected row of Pascal's triangle and each interval includes a number of steps corresponding to a respective entry from the selected row of Pascal's triangle. These techniques not only generate a drive signal with substantially no energy at the expected resonant frequency, they provide a zero-energy "notch" of sufficient width to tolerate systems in which the actual resonant frequency differs from the expected resonant frequencies.

FIG. 5 is a graph illustrating an exemplary drive signal according to an embodiment of the present invention. The drive signal is a multi-stage step function that changes at times corresponding to a time constant:

$$t_c \cong \frac{1}{2f_R}.$$ Eq. 1

This translates to a drive signal with two steps, a first step at time $t_0$, having an amplitude corresponding to approximately one half the level needed to traverse a distance separating a old position ($P_{OLD}$) from a new position ($P_{NEW}$) ($\Delta P = P_{NEW} - P_{OLD}$). A second step may occur at time $t_0 + t_c$, having an amplitude corresponding to the rest of the distance needed to be traversed. FIG. 6 illustrates differential response of the drive signal of FIG. 5.

FIG. 7 is a graph illustrating energy distribution of the drive signal of FIG. 5 by frequency. As shown, the drive signal has non-zero energy distribution at frequencies both above and below the resonant frequency $f_R$. At the resonant frequency $f_R$, the drive signal has zero energy. This energy distribution minimizes energy imparted to the mechanical system in the resonant region and, therefore, avoids oscillation that may occur in such systems.

FIG. 7 also illustrates energy distribution that may occur in a drive signal generated from a unitary step function (phantom). In this graph, the system has non-zero energy at the resonant frequency $f_R$, which causes energy to be imparted to the mechanical system at this frequency. This non-zero energy component at the resonant frequency $f_R$ is believed to contribute to the prolonged oscillation effect observed by the inventors.

Figure 8:
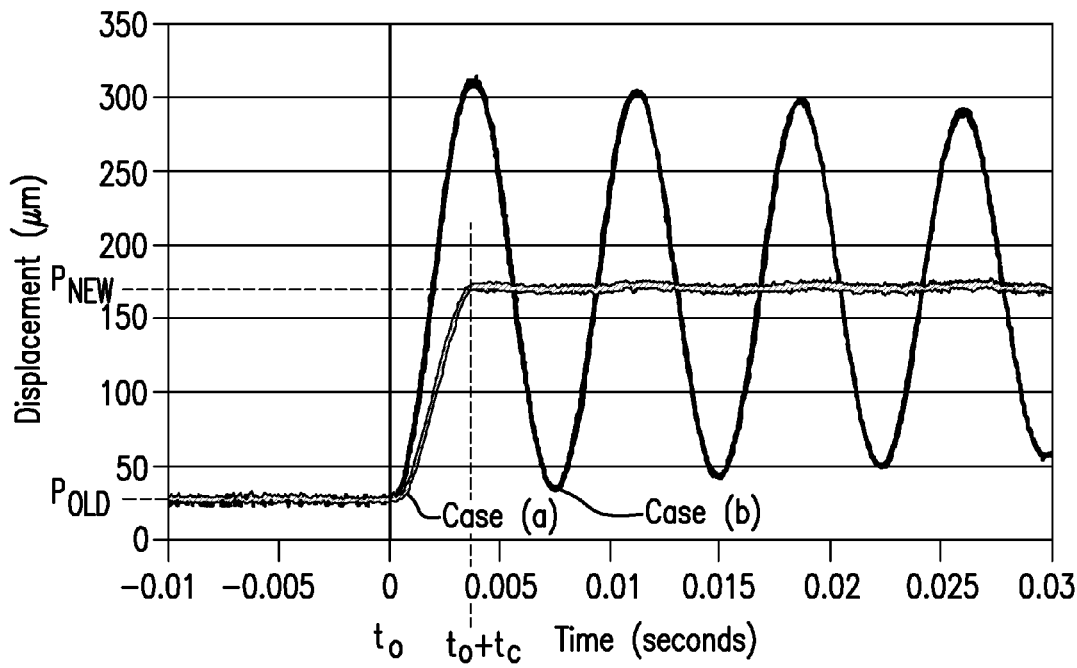
FIG. 8 illustrates response of a mechanical system observed under a drive signal such as shown in FIG. 5.

FIG. 8 is a graph that illustrates response of a mechanical system when driven by a drive signal having a shape as shown in FIG. 5 (case (a)). The mechanical system starts at a position $P_{OLD}$ and moves to a position $P_{NEW}$. Activation pulses are applied at times $t_0$ and $t_0 + t_C$. In this example, $P_{OLD}$ corresponds to 27 μm (digital code 50) and $P_{NEW}$ correspond to 170 μm (digital code 295), $t_0$ corresponds to t=0 and $t_C$ corresponds to 3.7 ms.

FIG. 8 compares the mechanical system's response under the drive signal proposed herein (case (a)) against the response observed when driven by a drive signal according to a unitary step function (case (b)). Whereas in case (a) the mechanical system has settled on the new position $P_{NEW}$ after about 4 ms, the same mechanical system exhibits prolonged oscillation in case (b). Even after 30 ms, the mechanical system continues to oscillate about the $P_{NEW}$ position. Accordingly, the drive signal of FIG. 5 provides substantially faster settling times than conventional drive signals.

Figure 9:
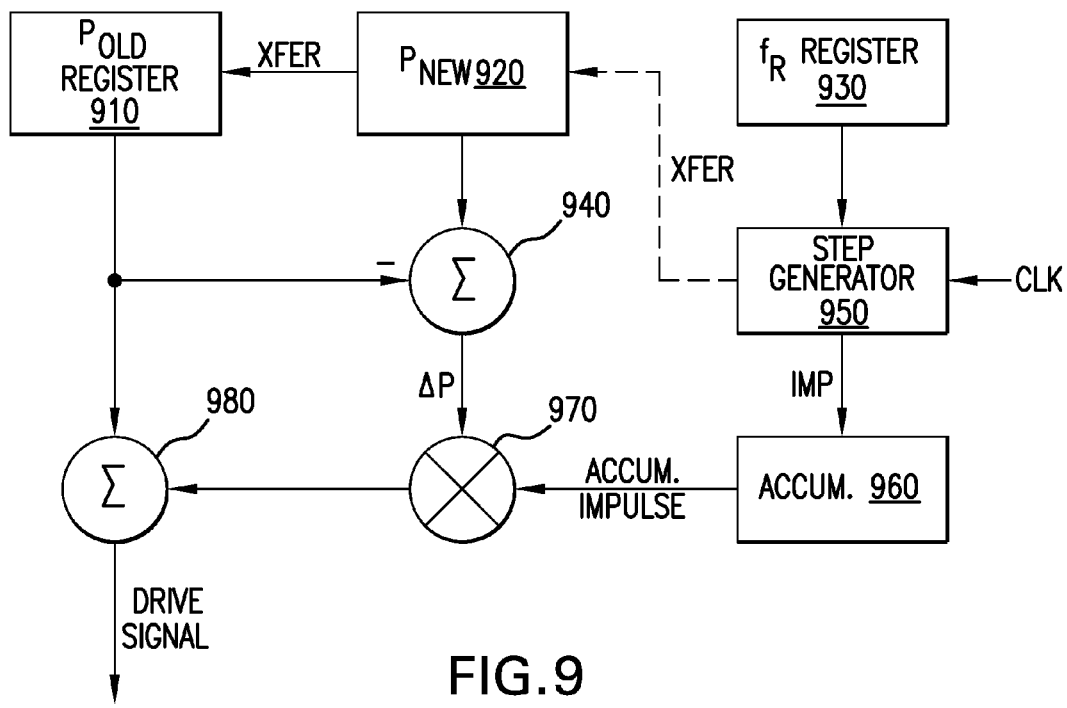
FIG. 9 is a block diagram of a system according to an embodiment of the present invention.

FIG. 9 is a block diagram of a system 900 according to an embodiment of the present invention. As shown, the system may include registers 910-930 for storage of data representing the old and new positions and the expected resonant frequency of the mechanical system. The system 900 may include a subtractor 940 to calculate $\Delta P$ from $P_{NEW}$ and $P_{OLD}$. The system 900 further may include a step generator 950 that receives a system clock and generates pulses to an accumulator 960 according to timing determined from Eq. 1. The step generator 950 may generate pulses, for example, as shown in FIG. 6, having amplitudes each corresponding to approximately one half the total distance to be traversed by the mechanical system. The accumulator 960 may sum the aggregate value of pulses generated by the step generator 950 and output the aggregate value to a multiplier 970 that also receives the $\Delta P$ value from the subtractor. Thus, the multiplier 970 generates a signal corresponding to the multi-step increments shown in FIG. 5. The output of the multiplier 970 may be input to an adder 980 that also receives the $P_{OLD}$ value from register 910. Thus, the adder 980 may generate a time varying output signal sufficient to drive a mechanical system from a first position to a second position with minimal settling time.

When the mechanical system completes its translation from the old position to the new position, the old position may be updated. In the system illustrated in FIG. 9, after the step generator 950 generates its final step to the accumulator, it also may generate a transfer signal to registers 910 and 920 to cause the old position register 910 to be updated with data from the new position register 920.

The drive signal of FIG. 5 works well if the resonant frequency $f_R$ of the mechanical system matches the 'notch' of the drive signal precisely (e.g. within ±3%). Unfortunately, system manufacturers often do not know the resonant frequency of their mechanical systems precisely. Moreover, particularly in consumer devices where system components must be made inexpensively, the resonant frequency can vary across different manufacturing lots of a common product. Thus, although a motor driver might be designed to provide a notch at an expected resonant frequency $f_{RE}$, there can be a substantial difference between the expected resonant frequency and the actual resonant frequency of the mechanical system ($f_{RM}$).

Figure 10:
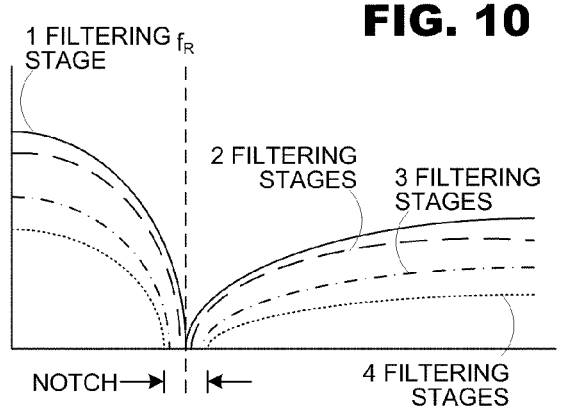
FIG. 10 is a graph illustrating energy distribution by frequency of another drive signal of the present invention.

To accommodate such uses, the principles of the present invention may be expanded to expand the frequency notch to allow greater tolerance in the resonant frequencies used with such systems. One such expansion includes providing multiple layers of filtering to 'widen' the notch. FIG. 10 is a graph showing the expected effects of multiple layers of filtering. Four such layers of filtering are illustrated. Each such additional layer of filtering expands a "notch" of frequencies for which there is zero energy imparted to the system. Although each layer of filtering diminishes the aggregate amount of energy imparted to the system and, therefore, may cause slower movement by the mechanical system, such filtering may be advantageous to overall system operation by reducing settling times for mechanical systems even when the resonant frequency of such systems cannot be predicted with precision.

Figure 11:
FIG. 11 is a block diagram of a system according to an embodiment of the present invention.

FIG. 11 illustrates a simplified block diagram of a system 1100 according to another embodiment of the present invention. The system includes a drive signal generator 1110 and one or more notch limit filters 1120.1-1120.N provided in series. A first filter 1120.1 in the system 1100 may accept a drive signal from the drive signal generator 1110. Each of the N filters (N≧1) may filter its input signal at an expected resonant frequency ($f_{RE}$). Because the filters are provided in cascade, the multiple filters may operate collectively to provide a filtered drive signal having a notch that is wider than would occur from a single filter system. Alternatively, the additional notches may be placed at different frequencies around the expected single resonant frequency in order to widen the filter's attenuation band.

In the time domain, the additional levels of filtering provide a step response as follows:

TABLE 1

| TIME | 0 | $T_c$ | $2T_c$ | $3T_c$ | $4T_c$ |
|---|---|---|---|---|---|
| 1 Stages | 1 | 1 | | | |
| 2 Stages | 1 | 2 | 1 | | |
| 3 Stages | 1 | 3 | 3 | 1 | |
| 4 Stages | 1 | 4 | 6 | 4 | 1 |

The output drive signals follow the step responses as shown in Table 1 after having been normalized (the steps are scaled so their sum equals 1). For example, with respect to a three-stage system, the step responses would be set to ⅛, ⅜, ⅜ and ⅛ at each of the times noted in Table 1. Drive signals are generated from a sum of the step responses over time. Thus, the drive signals of Table 1 may generate waveforms having the shape shown in FIG. 12.

The progression shown in Table 1 matches the progression of Pascal's Triangle. In an embodiment, an arbitrary N stage filter may be employed by using a progression taken from a corresponding $N^{th}$ row of Pascal's Triangle. An arbitrary number of stages may be used as desired to protect against uncertainty in the expected resonant frequency of the mechanical system. Although any number of stages may be used, higher numbers of stages involve increased settling times and therefore the number of stages should be chosen with care.

Figure 13:
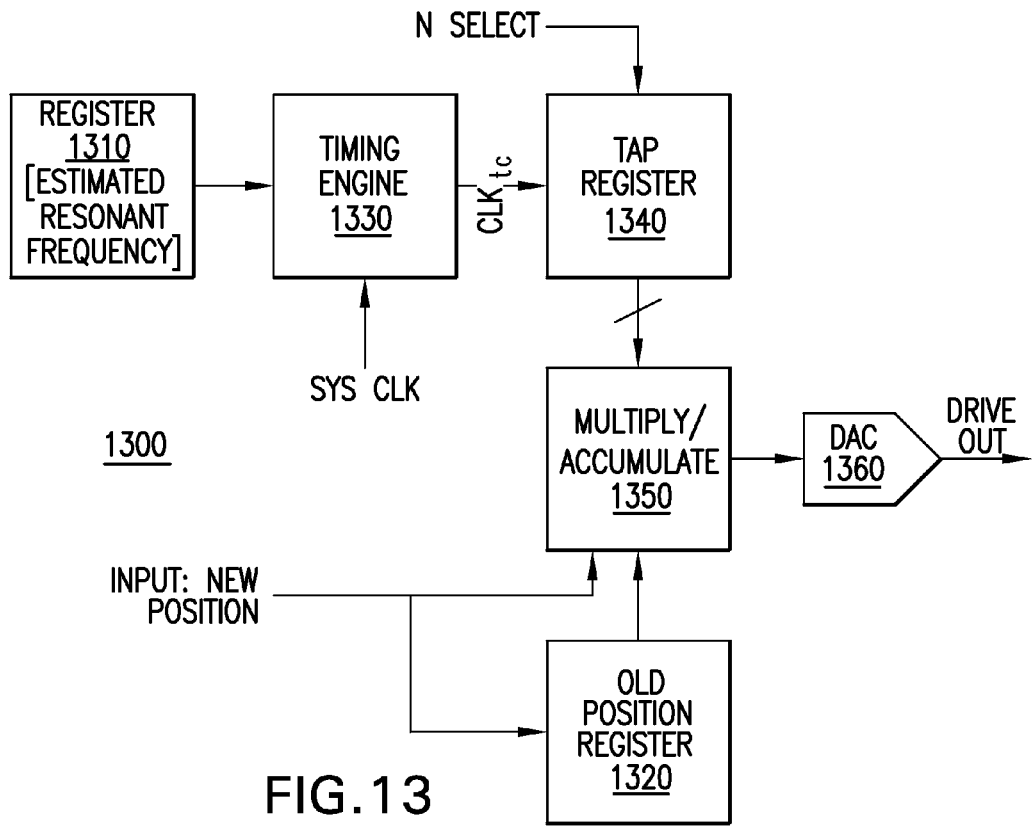
FIG. 13 is a simplified block diagram of a drive signal generator according to an embodiment of the present invention.

FIG. 13 is a block diagram of a signal generator 1300 according to an embodiment of the present invention. The signal generator 1300 may include a pair of registers 1310, 1320 to store data representing the estimated resonant frequency and the current position $P_{OLD}$ of the mechanical system. A timing engine 1330 and a tap register 1340 may generate an corresponding to an appropriate step pattern such as those illustrated in Table 1. Specifically, the timing engine 1330 may clock the tap register 1340 at a rate corresponding to time intervals $t_c$ determined by the stored estimated resonant frequency. The tap register 1340 may store data representing the normalized values of Pascal's triangle. Based on a control signal (N select) identifying the row of Pascal's triangle to be applied, the tap register 1340 sequentially may output step values corresponding to each entry in the row on each cycle of the $t_C$ clock.

A multiply accumulate (MAC) unit 1350 may receive data representing the new position $P_{NEW}$, the old position $P_{OLD}$ and the step pattern data from the tap register 1340. Mathematically, the MAC 1340 may generate a digital drive code as:

$$\text{Drive}(t) = P_{OLD} + (P_{NEW} - P_{OLD}) \cdot \Sigma \text{step}(t), \text{ where}$$

step(t) represents the step response of the selected pattern and t varies across all $t_C$ intervals that are relevant for the selected pattern. A digital-to-analog converter (DAC) 1360 may generate an analog drive output signal from the MAC's digital output. The output signal may be generated as current or voltage.

The solution of FIG. 13 provides a wider notch as desired over the embodiment of FIG. 9 but does so at increased complexity. Normalized values of each row of Pascal's triangle must be stored in memory at the tap register or calculated dynamically. Such complexity may be avoided in another embodiment of the present invention in which timing misalignment is applied to the step graphs.

Consider the step response shown in Table 1. The response of any stage N (say n=3) is the sum of a prior stage N−1 and a replica of the same (stage N−1) delayed by a time constant $t_c$. For example:

TABLE 2

| NO STAGES | TIME CONSTANT | | | | |
|---|---|---|---|---|---|
| | 0 | $T_c$ | $2T_c$ | $3T_c$ | $4T_c$ |
| 1 | 1 | 1 | | | |
| | ↓ ↘ | ↓ ↘ | | | |
| 2 | 1 | 2 | 1 | | |
| | ↓ ↘ | ↓ ↘ | ↓ ↘ | | |
| 3 | 1 | 3 | 3 | 1 | |
| | ↓ ↘ | ↓ ↘ | ↓ ↘ | ↓ ↘ | |
| 4 | 1 | 4 | 6 | 4 | 1 |

In an embodiment, the system generates step response patterns that represent replica signals that are misaligned with respect to each other slightly in time (shown as Δt in Table 3 below). The step response patterns may be represented as follows:

TABLE 3

| | | $t_c$ | | | | $2t_c$ | | | | | | $3t_c$ | | | | |
|---|---|---|---|---|---|---|---|---|---|---|---|---|---|---|---|---|
| N | t0 | +0 | +Δt | +2Δt | +3Δt | +0 | +Δt | +2Δt | +3Δt | +4Δt | +5Δt | +0 | +Δt | +2Δt | +3Δt | 4tc |
| 1 | 1 | 1 | | | | | | | | | | | | | | |
| 2 | 1 | 1 | | 1 | | 1 | | | | | | | | | | |
| 3 | 1 | 1 | 1 | 1 | | 1 | 1 | 1 | | | | 1 | | | | 1 |
| 4 | 1 | 1 | 1 | 1 | 1 | 1 | 1 | 1 | 1 | 1 | 1 | 1 | 1 | 1 | 1 | 1 |

Figure 14:
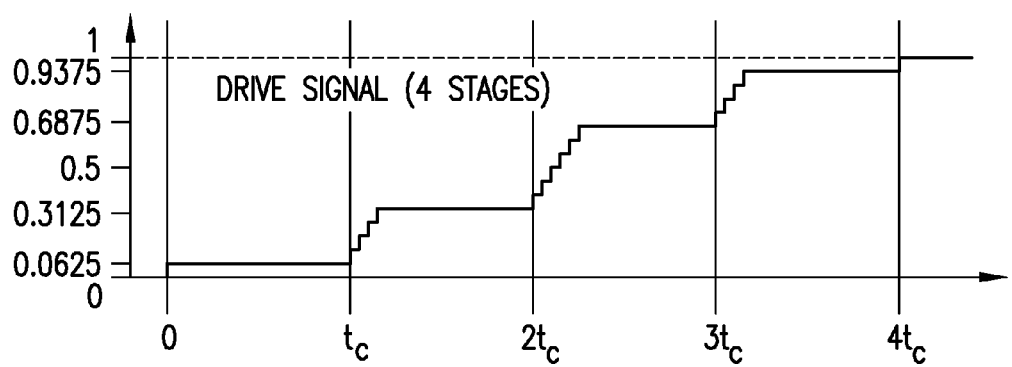
FIG. 14 is a graph illustrating another exemplary drive signal according to an embodiment of the present invention.

The step patterns may generate a drive signal such as shown in the example of FIG. 14. In the example illustrated, N=4.

In practice, the Δt time intervals may be provided by a system clock within the motor driver, which may be much faster than the $t_c$ time interval calculated from the expected resonant frequency $f_R$. FIG. 14 is not drawn to scale. In one embodiment, some coefficients may be swapped with each other in order to widen the attenuation band. Coefficient swapping may reduce the requirements of small $t_c$ time intervals. Δt, for example, may be set to $\frac{1}{4}t_c$ or $\frac{1}{8}t_c$ when coefficient swapping is utilized.

A time domain embodiment may include a cascade of unequally distributed notches provided by a convolution of N filters, each filter corresponding to the first row of Pascal's triangle. The filters may be tuned to present notches around the nominal resonance frequency. The filters may also be convolved using a common time base as defined by a minimum common multiplier of their time constant $t_c$.

Figure 15:
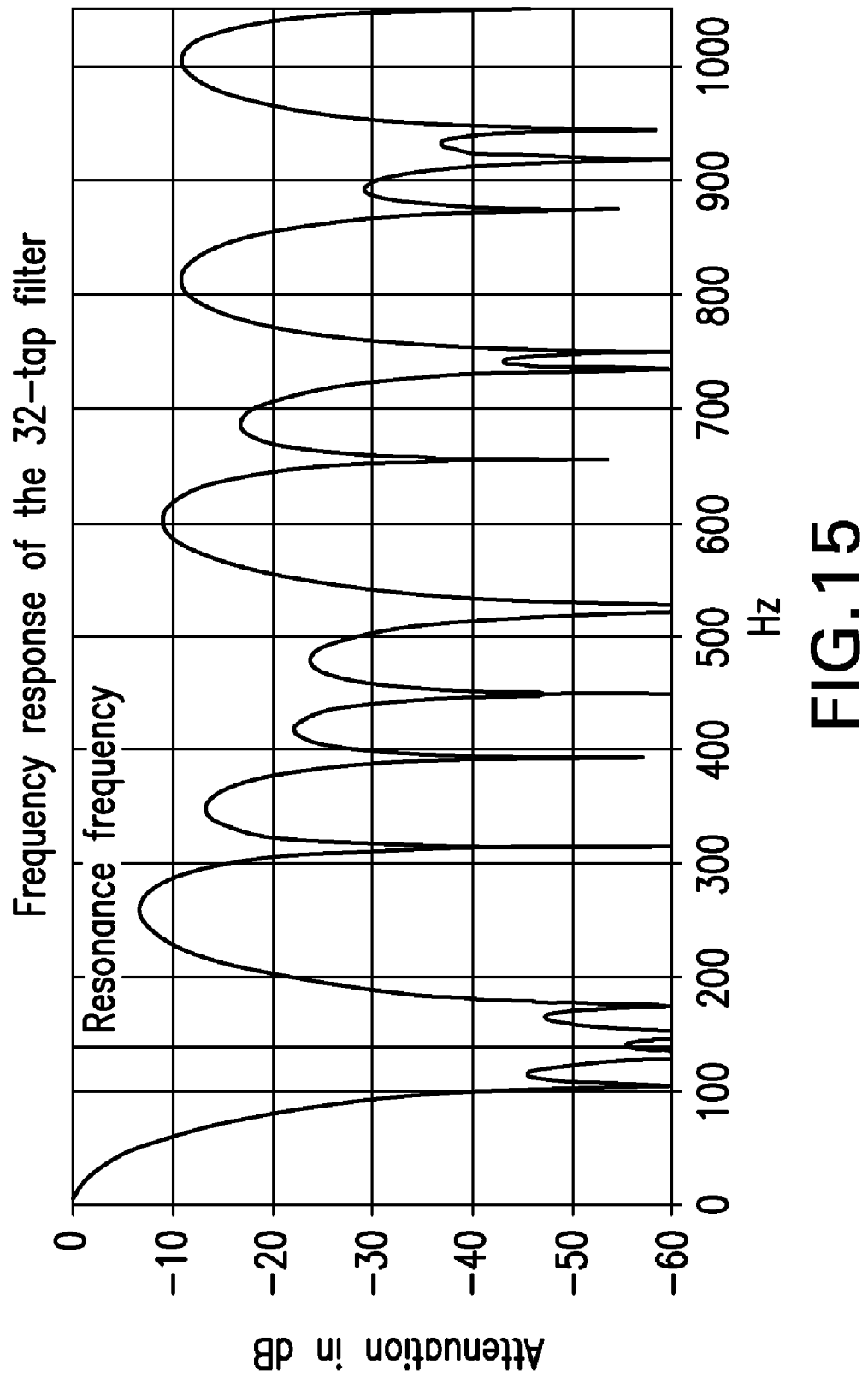
FIG. 15 is a graph illustrating a frequency response of an exemplary filtering system.

One example may include 4 filters whose responses are {1 00000 1} {1 000000 1} {1 0000000 1} and {1 000000000 1}. When the 4 filters are convolved with a time base of approximately 30 times the resonance period, a 32-tap filter with coefficients {1 0 0 0 0 0 1 1 1 0 1 0 0 1 1 1 1 1 1 0 0 1 0 1 1 1 0 0 0 0 0 1} results. FIG. 15 illustrates the frequency response of the example 32-tap filter for a 140 Hz nominal resonance frequency.

Figure 16:
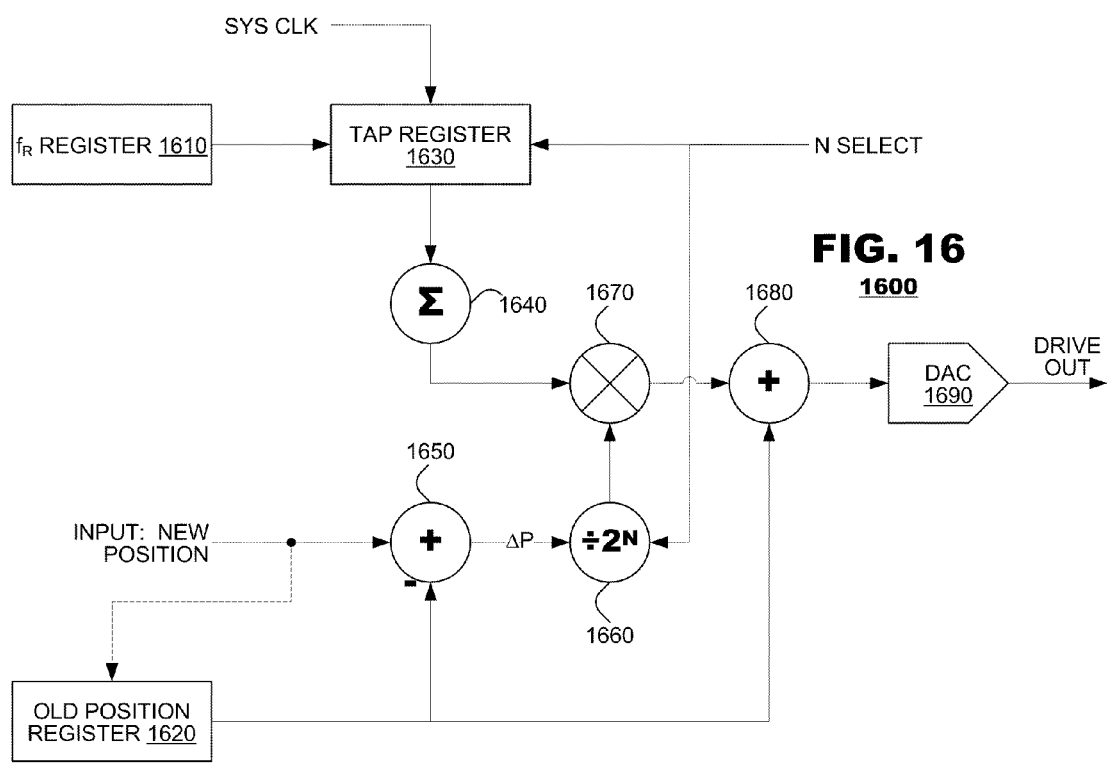
FIG. 16 is a simplified block diagram of a drive signal generator according to another embodiment of the present invention.

FIG. 16 illustrates a drive signal generator 1600 according to another embodiment of the present invention. The drive signal generator may include a pair of registers 1610, 1620 to store data representing the estimated resonant frequency of the mechanical system and a current position of the mechanical position ($P_{OLD}$). The drive signal generator may include a tap register 1630 that stores distributed step patterns such as those shown in Table 3. In response to each iteration of a system clock (corresponding to Δt), the tap register 1630 may shifts out a single bit of the step pattern. The tap register may include buffer bits (zeroes) corresponding to time intervals separating each time constant $t_c$. The shifted bits may be output to an accumulator 1640 which computes a running sum of pulses over time.

A subtractor 1650 may calculate ΔP from the old and new positions ($\Delta P = P_{NEW} - P_{OLD}$). A divider may divide the ΔP by a factor $\frac{1}{2^N}$, which may be implemented with a simple bit shift, where N represents the row of Pascal's triangle currently in use. A multiplier 1670 and adder 1680 complete generation of the drive signal which, mathematically, may be represented as:

$$\text{Drive}(t) = P_{OLD} + \frac{1}{2^N}(P_{NEW} - P_{OLD}) \cdot \sum \text{step}(t).$$

In this embodiment, the step(t) term again represents pulses from the tap register. In this embodiment, however, the tap register need not store normalized step values. Instead, the tap register may store single bit values (1s) at each of the Δt positions for which incremental contribution is required (see, Table 3). Within each of the N rows, the single bit steps sum to $2^N$. In this embodiment, the divider 1660 accomplishes normalization while permitting a simple implementation of the tap register. The DAC may generate an analog signal, either voltage or current, from the codeword output by the adder 1680.

While FIG. 16 illustrates the tap register 1630 being clocked by a system clock, the tap register alternatively may be clocked by a timing generator (not shown), that becomes active during a time period defined by each time constant $t_C$ and, when active, clocks the tap register at a rate of Δt. When each burst of pulses concludes, the timing generator may be deactivated until the next $t_C$ interval occurs. This second embodiment permits the size of the tap register to be made smaller but increases complexity of the clocking system.

Figure 17:
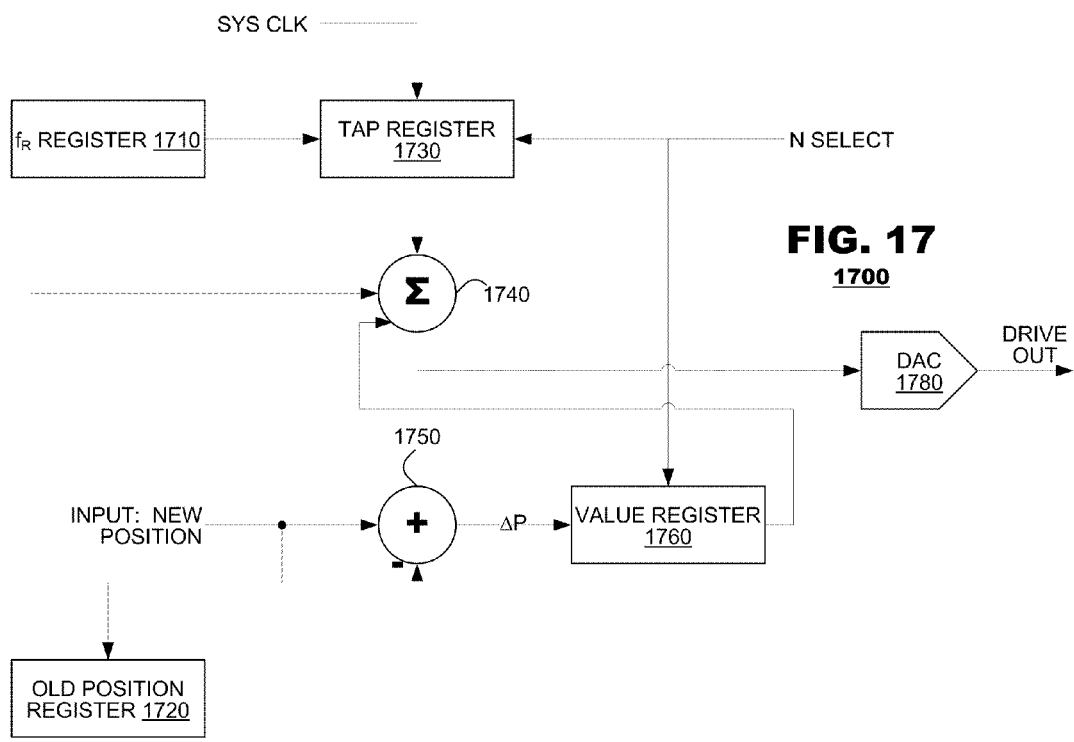
FIG. 17 is a simplified block diagram of a drive signal generator according to another embodiment of the present invention.

FIG. 17 illustrates a drive signal generator 1700 according to another embodiment of the present invention. The drive signal generator may include a pair of registers 1710, 1720 to store data representing the estimated resonant frequency of the mechanical system and a current position of the mechanical position ($P_{OLD}$). The drive signal generator may include a tap register 1530 that stores distributed step patterns such as those shown in Table 3. In response to each iteration of a system clock (corresponding to Δt), the tap register 1730 may shift out a single bit of the step pattern. The tap register may include buffer bits (zeroes) corresponding to time intervals separating each time constant $t_c$. The shifted bits may be output to an accumulator/adder 1740.

In this embodiment, the $P_{OLD}$ value may be preloaded into the accumulator 1740. A subtractor 1750 may calculate ΔP from the old and new positions ($\Delta P = P_{NEW} - P_{OLD}$). Value register 1760 may use N bit shifting to divide ΔP by $2^N$ in order to calculate step sizes. The calculated steps may be stored in the value register 1760. Accumulator 1740, which is initialized with the old position value, may compile the content value contained in the value register 1760 each time the tap register 1730 shifts a bit with a value of one. The accumulator 1740 completes the generation of the drive signal, and the DAC 1780 may generate an analog signal, either voltage or current, from the codeword output by the accumulator 1740.

The embodiments of FIGS. 16 and 17 are advantageous because they provide for simpler implementation than the embodiment of Table 1 & FIG. 13. The step responses of the FIG. 14/Table 3 embodiment are uniform and, therefore, there is no need to develop fractional step response values as discussed with respect to Table 1. As with the FIG. 13 embodiment, the FIG. 16 and FIG. 17 embodiments also contribute to a wider notch as compared to the FIG. 5 embodiment.

Many mechanical systems do not move from the starting mechanical stop position immediately upon application of a drive signal. There usually are spring forces or other inertial forces that are not overcome until the amplitude of the drive signal reaches some threshold value $D_{TH}$ (FIG. 18). The threshold value often is unknown and may vary from manufacturing lot to manufacturing lot.

To improve response times, when moving from a start position corresponding to a mechanical stop position, embodiments of the present invention may advance the drive signal to a value corresponding to the threshold drive signal $D_{TH}$ (FIG. 19) and calculate ΔP as a difference between $D_{TH}$ and the drive signal level sufficient to move the mechanical system to the destination position. When applying a drive signal to such a system, the drive signal may include the $D_{TH}$ level applied immediately from the motor drive and a time-varying component corresponding to a stepped drive signal of one of the foregoing embodiments (FIGS. 5, 12 and/or 14) provided atop the $D_{TH}$ level. The threshold drive $D_{TH}$ may be estimated in a "blind" fashion (e.g. based on expected properties of the mechanical systems, which may or may not be true). Alternatively, the threshold value may be programmed into the system via a register.

Figure 1:
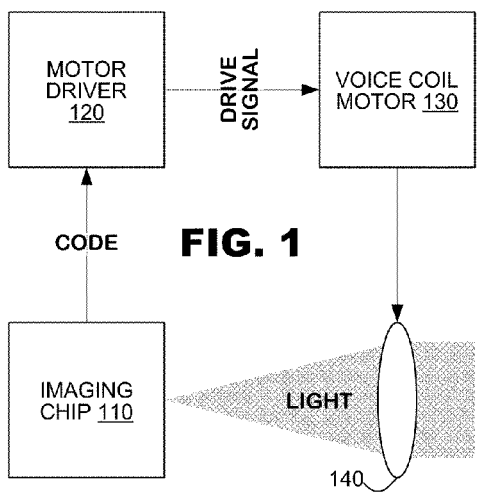
FIG. 1 is a block diagram of an exemplary mechanical system suitable for use with the present invention.
Figure 2:
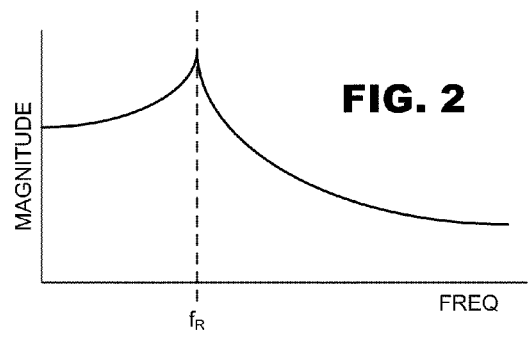
FIG. 2 is a graph of frequency response of an exemplary mechanical system and oscillation that may occur during activation.
Figure 3:
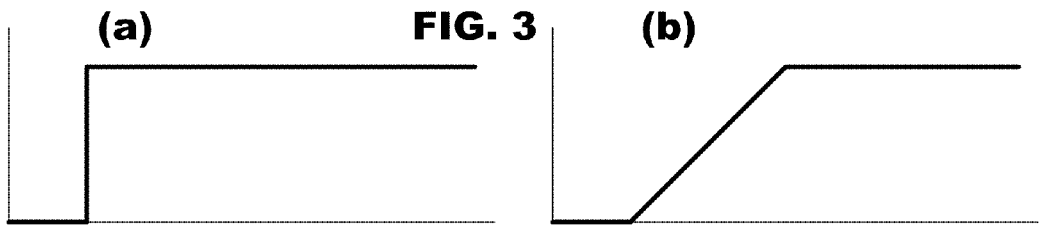
FIG. 3 illustrates conventional drive signals for mechanical systems.

The principles of the present invention find application in a variety of electrically-controlled mechanical systems. As discussed above, they may be used to control lens assemblies in auto-focus applications for cameras and video recorders such as shown in FIG. 1. It is expected that systems using the drive signals discussed herein will achieve improved performance because the lens assemblies will settle at new locations faster than may occur in systems with conventional drive signals. Accordingly, cameras and video recorders will generate focused image data faster than previously achieved, which we generate greater throughput.

Figure 20:
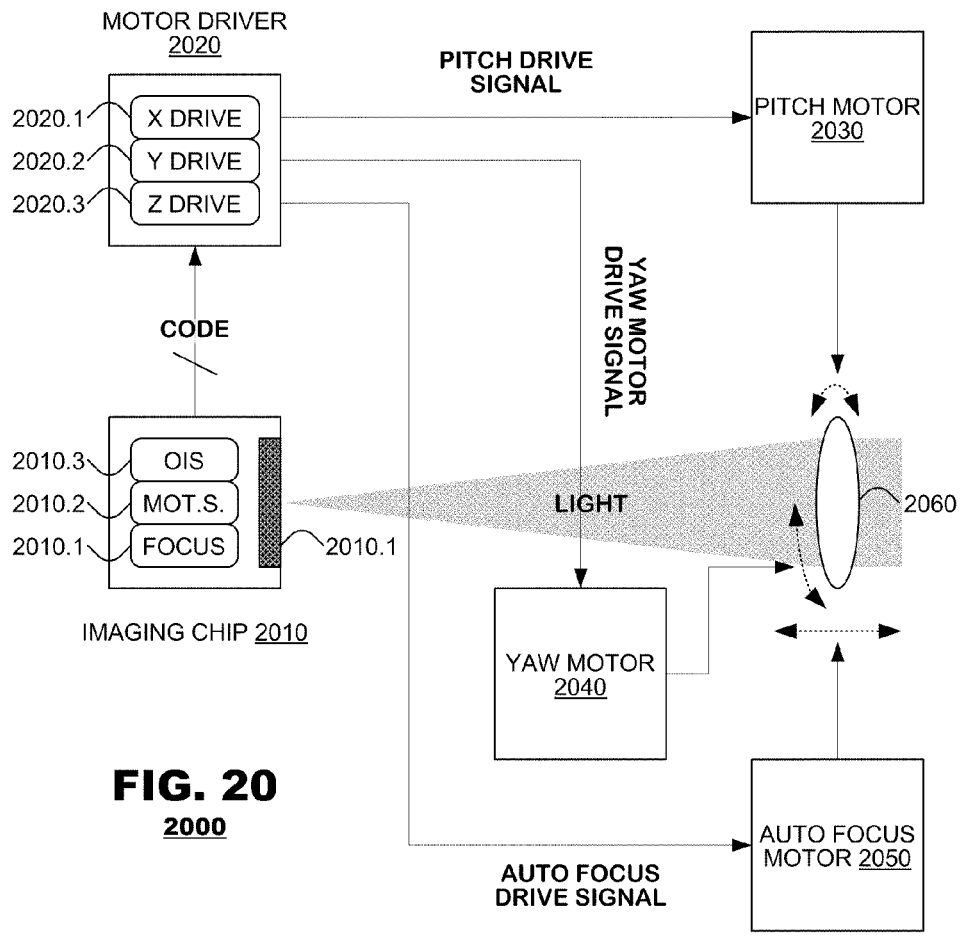
FIG. 20 is a block diagram of another mechanical system suitable for use with the present invention

FIG. 20 illustrates another system 2000 according to an embodiment of the present invention. The system 2000 of FIG. 20 illustrates a lens control system with multiple dimensions of movement. This system, as with FIG. 1, may include an imaging chip 2010, a motor driver 2020, various motors 2030-2050 and a lens 2060. Each motor 2030-2050 may drive the lens in a multi-dimensional space. For example, as shown in FIG. 20, an auto focus motor 2030 may move the lens laterally with respect to the imaging chip 2010, which causes light to be focused in a light-sensitive surface 2010.1 of the chip 2010. A pitch motor 2040 may rotate the lens through a first rotational axis to control orientation of the lens 2060 in a first spatial dimension. A yaw motor 2050 may rotate the lens through a second rotational axis, perpendicular to the first rotational axis, to control orientation of the lens 2060 in another spatial dimension.

In the embodiment of FIG. 20, the imaging chip 2010 may include processing units to perform auto-focus control 2010.1, motion detections 2010.2 and optical image stabilization (OIS) 2010.3. These units may generate codewords for each of the drive motors 2030-2050, which may be output to the motor driver 2020 on an output line. In the embodiment shown in FIG. 20, the codewords may be output to the motor driver 2020 in a multiplexed fashion. The motor driver 2020 may include motor drive units 2020.1-2020.3 to generate analog drive signals for each of the drive motors 2030-2050. The analog drive signals may be generated according to the foregoing embodiments discussed herein. As with the case of a one dimensional lens driver, it is expected that a multi-dimensional lens driver that is driven as shown in the foregoing embodiments will achieve faster settling times than lens drivers driven according to conventional drive signals.

Figure 21:
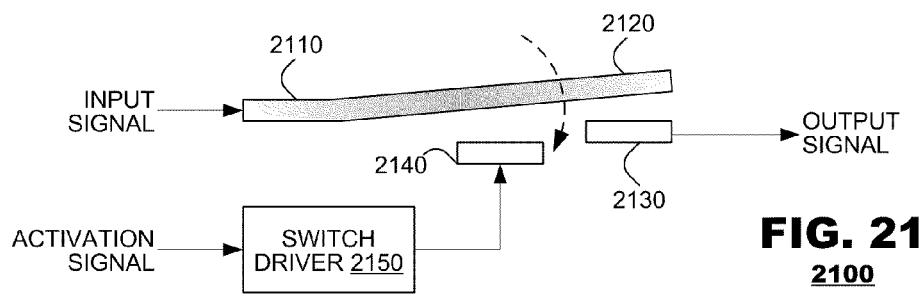
FIG. 21 is a simplified diagram of a MEMS switch system according to an embodiment of the present invention.

The principles of the present invention finds application in other systems, for example, MEMS-based switches as shown in FIG. 21. Such systems may include a switch member 2110 that moves under control of a control signal between an open position and a closed position. When closed, a movable 'beam' portion 2120 of the switch member 2110 is placed in contact with an output terminal 2130. The control signal is applied to the switch member 2110 through a control terminal 2140 that imparts electrostatic forces upon the switch member 2110 to move it from a normally open position to the closed position. In this regard, the operation of a MEMS switch is known.

Figure 12:
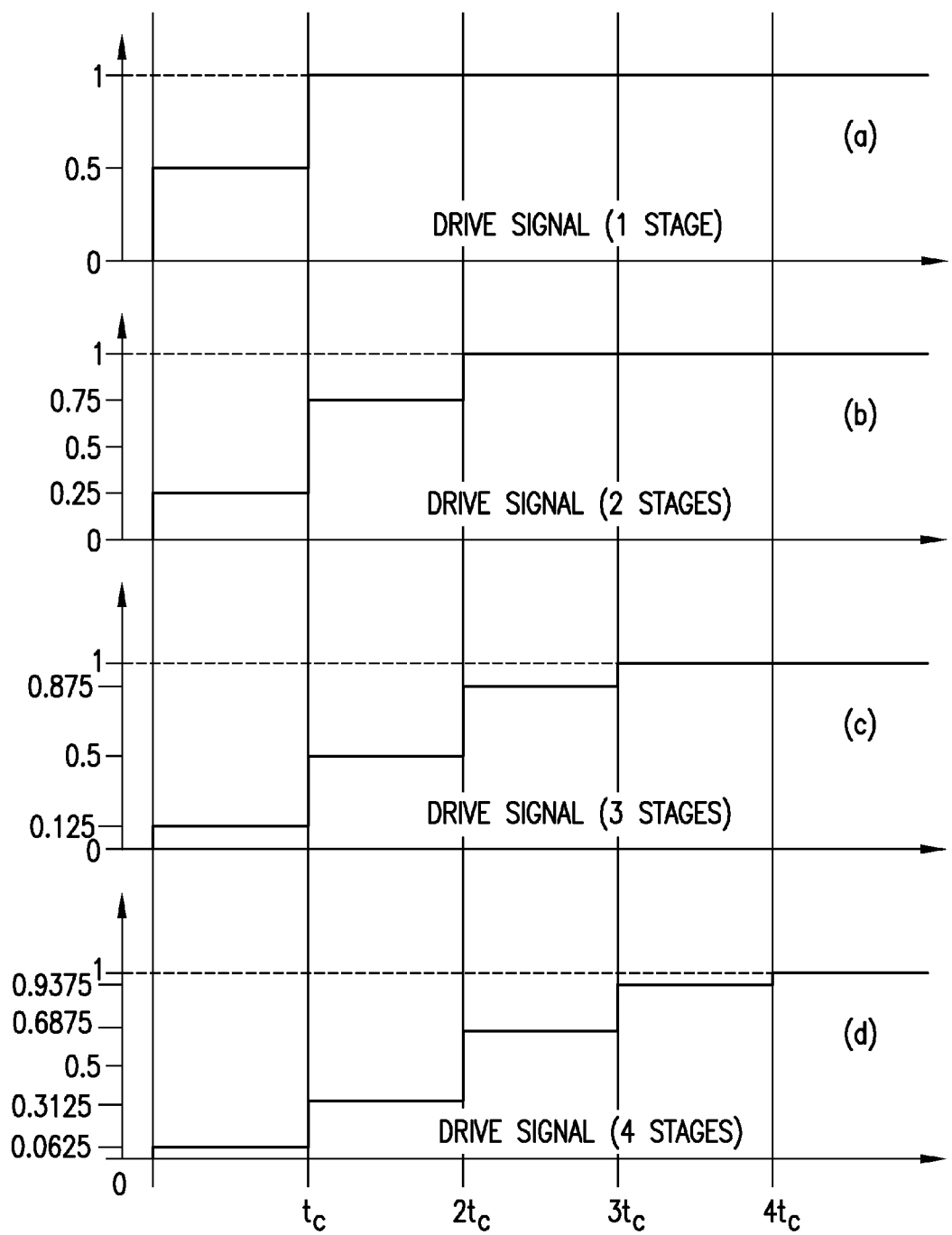
FIG. 12 is a graph illustration other exemplary drive signals according to an embodiment of the present invention.

According to an embodiment, a MEMS control system may include a switch driver 2150 that, responsive to an actuating control signal, generates a drive signal to the MEMS-switch having a shape such as shown in FIG. 5, 12 or 14. MEMS switches will possess from which an expected resonant frequency and, by extension, the time constant $t_C$ may be derived. The switch driver 2150 may apply steps having an aggregate amplitude sufficient to move the beam 2120 toward the output terminal 2130. At the conclusion of a final time constant, the switch driver 2150 may apply a final step to halt the beam 2120 at the closed position with minimal oscillation.

Figure 22:
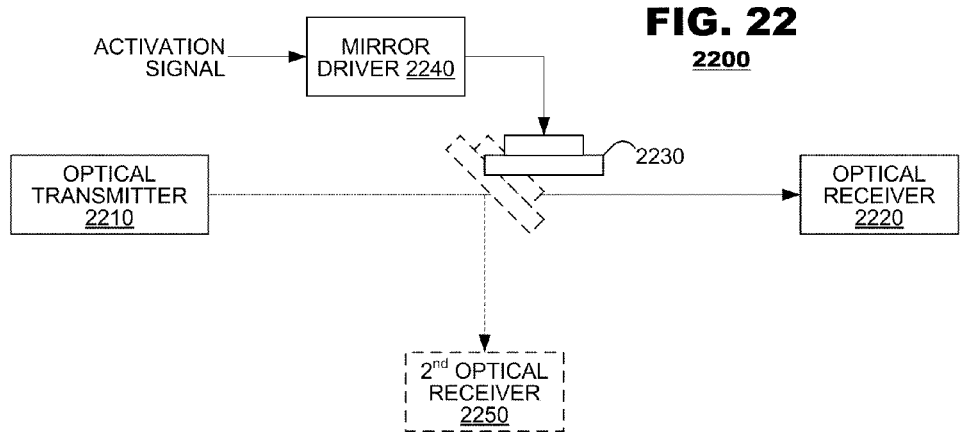
FIG. 22 is a simplified diagram of a MEMS mirror control system according to an embodiment of the present invention.

The principles of the present invention also may find application in optical MEMS systems, such as shown in FIG. 22. There, an optical transmitter 2210 and optical receiver 2220 are provided in a common optical path. A MEMS mirror 2230 may be provided along the optical path, which may translate from a first position to a second position under control of a drive signal. In a default state, for example, the MEMS mirror 2230 may be positioned out of the optical path between the transmitter 2210 and the receiver 2220. In an activated state, however, the MEMS mirror 2230 may move to obscure the optical path, which causes the transmitted beam of light to be blocked from reaching the receiver 2220.

According to an embodiment, a MEMS control system may include a mirror driver 2240 that, responsive to an actuating control signal, generates a drive signal to the MEMS-mirror 2230 to cause it to move from a default position to an activated position. The mirror 2230 may possess a mass from which an expected resonant frequency and, by extension, the time constant $t_C$ may be derived. The mirror driver 2240 may apply steps having an aggregate amplitude sufficient to move the mirror 2230 toward the activated position. At the conclusion of a final time constant, the mirror driver 2240 may apply a final step to halt the mirror 2230 at the activated position with minimal oscillation.

The optical system 2200 optionally may include a second receiver 2250 provided along a second optical path that is formed when the mirror 2230 moves to the activated position. In this embodiment, the system 2200 may provide a routing capability for optical signals received by the optical system 2200.

Figure 23:
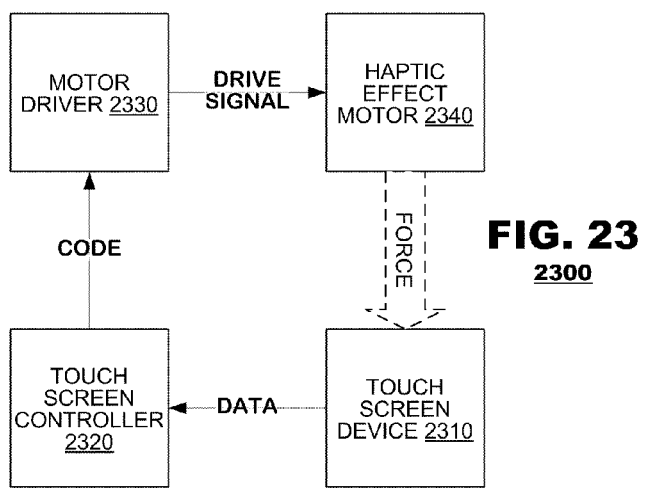
FIG. 23 is a simplified diagram of a haptic control system according to an embodiment of the present invention.

The principles of the present invention may find application in touch sensitive sensor devices that use tactile or haptic feedback to confirm receipt of data. Haptic devices provide feedback that simulates the "click" of a mechanical button or other tactile feedback. Shown in FIG. 23, such devices 2300 may include a touch screen panel 2310 to capture data from an input device, commonly an operator's finger, a stylus or other object. The touch screen panel 2310 generates data to a touch screen controller 2320 that processes the panel data to derive a screen position on which the operator entered data. To provide the haptic feedback, the touch screen controller 2320 may generate a digital codeword to a motor driver, which generates a drive signal to a haptic motor controller 2330. The haptic motor controller 2330 may generate a drive signal to a haptic effect motor 2340 which imparts a force upon a mechanical device within the touch screen panel 2310 that generates the tactile feedback.

According to an embodiment, the motor driver 2330 may generate a drive signal to the haptic effect motor 2340 according to a shape such as shown in FIG. 12 or 14. The haptic effect motor 2340 and associated mechanical components of the touch screen device may possess a mass from which an expected resonant frequency and, by extension, the time constant $t_C$ may be derived. The motor driver 2330 may apply a series of steps according to a selected row of Pascal's triangle or any embodiments of the present invention described herein. Owing to a varying mass being controlled due to user interaction, the steps may originate from a deeper row (e.g., the $4^{th}$ row or deeper) of Pascal's triangle than for other applications. It is expected that the stepped pulse drive signal will generate tactile feedback within the touch screen device that begins and concludes sharply and, therefore, provide feedback sensations that strongly mimic mechanical devices.

Figure 24:
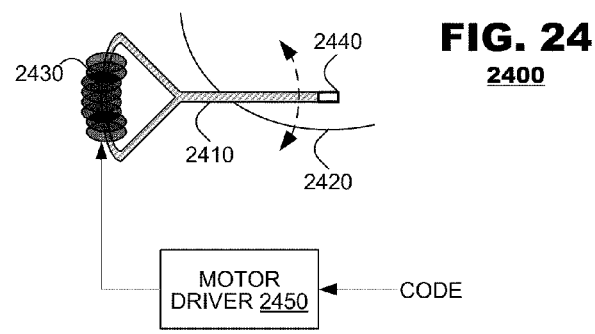
FIG. 24 is a simplified diagram of a disk reader according to an embodiment of the present invention.

The principles of the present invention also may find application in optical or magnetic disk readers, which may include swing arms or sled based readers. One common structure for disk readers is illustrated in FIG. 24, which illustrates a motor-driven swing arm 2410 provided over a disk surface 2420. The swing arm may include a motor coil 2430 mounted thereon which, when drive signals are supplied to it, generates magnetic flux that interacts with magnets (now shown) to move the swing arm across a range of motion. In this manner, a read head 2440 provided on the swing arm can address an identified track of information from the disk and read information.

According to an embodiment, a disk reader control system may include a motor driver 2450 that, responsive to a codeword, generates a drive signal to the motor coil 2430 having a shape such as shown in FIG. 5, 12 or 14. Swing arms (and sleds) may possess inertia from which an expected resonant frequency $f_R$ and, by extension, the time constant $t_C$ may be derived. The motor driver 2450 may apply steps having an aggregate amplitude sufficient to move the disk reader to a new position. At the conclusion of a final time constant, the motor driver 2450 may apply a final step to halt the reader at the addressed position with minimal oscillation.

Figure 25:
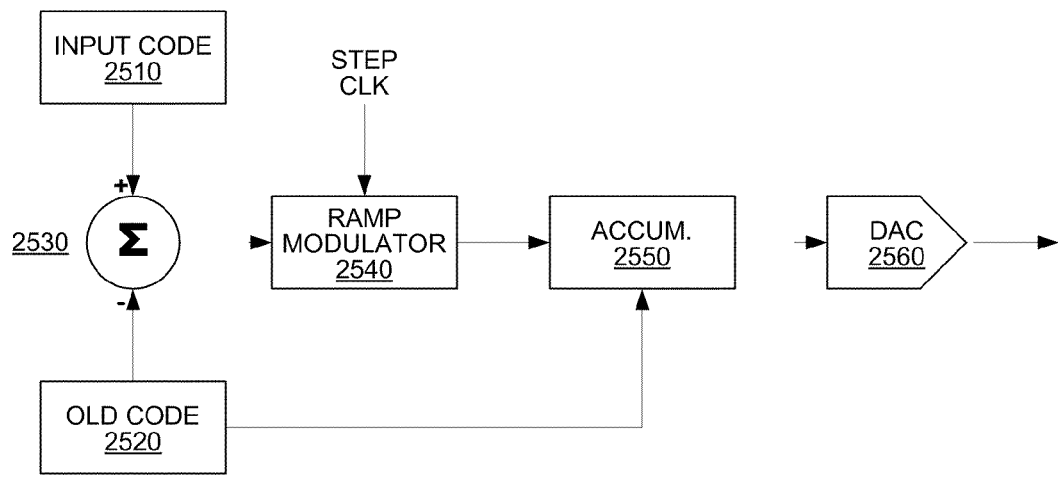
FIG. 25 is a simplified block diagram of a drive signal generator according to another embodiment of the present invention.

According to an embodiment, a drive signal generator 2500 of FIG. 25 may produce ramp-based motor drive signals with a fixed drive window. In prior motor driver systems, ramp signals are provided with a constant rate of change. In these "slope" ramp signal systems, the time to drive a mechanical system to a desired location is dependant on the distance to be traversed. For example, it would take twice as long to deliver a ramp signal corresponding to a movement 100 points as it would to deliver a ramp signal corresponding to a movement of 50 points. However, "slope" ramp signals require notch filtering and have varied frequency responses. A ramp based motor drive signal with a fixed drive window, on the other hand, may operate with linear filtering and have a constant frequency response.

The drive signal generator 2500 may include an input code register 2510 to store code representing a new position that is to be traversed. The drive signal generator 2500 may include an old code register 2520 to store code representing an old or current position of the mechanical system. A subtractor 2530 may calculate the separation distance between the old and new positions by subtracting the new position code from the old position code.

The drive signal generator 2500 may also include a ramp modulator 2540, clocked at a step clock rate, to generate a step response signal based on the separation distance. The step response may correspond to the individual steps in a particular drive signal. Furthermore, the drive signal generator 2500 may include an accumulator 2550 to generate a digital drive signal in response to the step response signal. The accumulator 2550 may be initialized with a value corresponding to the old code that was maintained from a prior operation. DAC 2560 may generate an analog drive signal from the digital drive signal.

Figure 26:
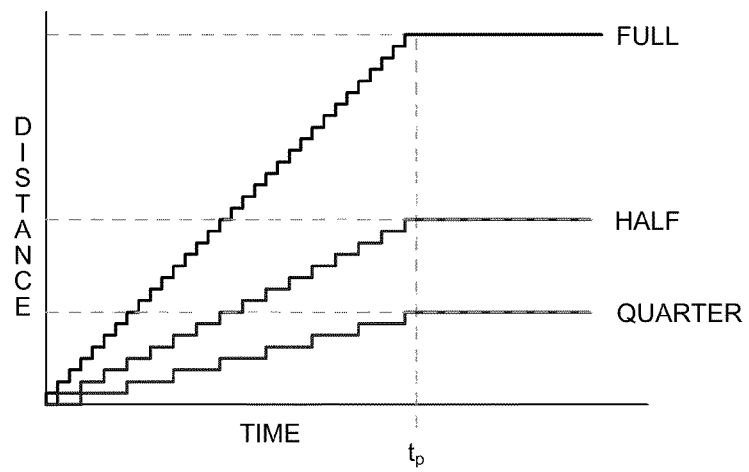
FIG. 26 is a graph illustrating exemplary drive signals according to an embodiment of the present invention.

FIG. 26 illustrates examples of ramp-based motor drive signals with a fixed drive window. The signals may cause the mechanical system to reach its desired destination within a predetermined time $t_p$, regardless of the separation distance. For example, FIG. 26 shows drive signals for full-range distance, half-range distance, and quarter-range distance traversal that operate for same predetermined time $t_p$. The predetermined time $t_p$ may be set corresponding to a time the mechanical system takes to traverse a full range displacement at 1 point/cycle. The number of steps taken to reach the desired destination may vary depending on the distance to be traversed. The steps may be distributed across time hence certain steps may 'not be taken.' For example, half-range displacement may have 50% of steps not taken as compared to the steps taken for full-range displacement. Quarter-range displacement, for example, may have 75% of steps not taken as compared to the steps taken for full-range displacement. Other ratios may cause corresponding ratios of step cycles but may also generate irregular patterns.

Drive signal generator 2500 may be used cooperatively with other embodiments described herein. For example, a motor driver system may operate in several modes with one mode being ramp based drive signal with fixed drive window mode.

Several embodiments of the present invention are specifically illustrated and described herein. However, it will be appreciated that modifications and variations of the present invention are covered by the above teachings and within the purview of the appended claims without departing from the spirit and intended scope of the invention. Additionally, it will be appreciated that the signals illustrated above represent idealized forms of drive signals with instantaneous response; in practice, some amount of slew can be expected from a motor driver in actual operating conditions. Such effects have been omitted from the foregoing discussion so as not to obscure the principles of the present invention.

We claim:

1. A method for generating a drive signal to a motor-driven mechanical system, comprising:
    applying a drive signal to the motor-driven mechanical system in a series of steps according to a selected row of Pascal's triangle, wherein:
    the number of steps equals the number of entries from the selected row of Pascal's triangle,
    each step has a step size corresponding to a respective entry of the selected row of Pascal's triangle, and
    the steps are spaced from each other according to a time constant $t_C$, by:

$$t_c \cong \frac{1}{2f_R}$$

where $f_R$ is an expected resonant frequency of the mechanical system.

2. The method of claim 1, wherein the drive signal has substantially zero energy at the expected resonant frequency.

3. The method of claim 1, wherein a final step of the drive signal parks the mechanical system as the designation position with substantially no oscillation.

4. The method of claim 1, further comprising,
    responsive to a codeword that identifies a destination position of the mechanical system, determining an amplitude of the drive signal having components representing:
a) a start position of the mechanical system and b) a difference between the start position and the destination position,
wherein the amplitude component corresponding to the different is distributed across the time spaced steps of the drive signal.

5. The method of claim 4, wherein the codeword identifies an addressable position within a range of motion of the mechanical system.

6. The method of claim 1, further comprising, when a start position of the mechanical system is a rest position,
determining an amplitude of the drive signal having a) a first component corresponding to a drive signal level required to move the mechanical system from the rest position and b) a differential component corresponding to a difference between the first component and a drive signal level required to move the mechanical system to the destination position,
wherein the differential component is distributed across the time spaced steps of the drive signal, and
wherein the first component is applied in the first step of the drive signal.

7. The method of claim 1, wherein an amplitude of the steps is determined from a codeword generated by an image signal processor and the drive signal is applied to a lens drive motor.

8. The method of claim 1, wherein the mechanical system is a lens system having a multi-dimensional range of motion, the image signal processor generates codewords corresponding to each dimension and the method generates multiple drive signals, one corresponding to each of the codewords.

9. The method of claim 8, wherein there are three dimensions and three codewords, one for lateral movement of the lens system, one for pitch of the lens system and one for yaw of the lens system.

10. The method of claim 1, wherein an amplitude of the steps is determined from a codeword is generated by an touch panel controller and the drive signal is applied to a haptic effect motor coupled to a touch panel.

11. The method of claim 1, wherein an amplitude of the steps is determined from a codeword is generated by an disk controller and the drive signal is applied to a swing arm-based disk reader.

12. The method of claim 1, wherein an amplitude of the steps is determined from a codeword is generated by an disk controller and the drive signal is applied to a sled-based disk reader.

13. A method for generating a drive signal to a motor-driven mechanical system, comprising:
applying a drive signal to the motor-driven mechanical system in a series of steps according to a selected row of Pascal's triangle, wherein:
the steps are grouped into a number of intervals, wherein the number of intervals equals the number of entries from the selected row of Pascal's triangle,
each step has a uniform step size,
each interval includes a number of steps corresponding to a respective entry from the selected row of Pascal's triangle, and
the intervals are spaced from each other according to a time constant $t_C$, by:

$$t_c \cong \frac{1}{2f_R}$$

where $f_R$ is an expected resonant frequency of the mechanical system.

14. The method of claim 13, further comprising,
responsive to a codeword that identifies a destination position of the mechanical system, determining an amplitude of the drive signal having components representing:
a) a start position of the mechanical system and b) a difference between the start position and the destination position,
wherein the step size is determined from the difference component.

15. The method of claim 13, further comprising, when a start position of the mechanical system is a rest position,
determining an amplitude of the drive signal having a) a first component corresponding to a drive signal level required to move the mechanical system from the rest position and b) a differential component corresponding to a difference between the first component and a drive signal level required to move the mechanical system to the destination position,
wherein the step size is determined from the difference component, and
wherein the first component is applied in the first step of the drive signal.

16. The method of claim 13, wherein an amplitude of the steps is determined from a codeword generated by an image processing system and the drive signal is applied to a lens drive motor.

17. The method of claim 13, wherein an amplitude of the steps is determined from a codeword is generated by an touch panel controller and the drive signal is applied to a haptic effect motor coupled to a touch panel.

18. The method of claim 13, wherein an amplitude of the steps is determined from a codeword is generated by an disk controller and the drive signal is applied to a swing arm-based disk reader.

19. The method of claim 13, wherein an amplitude of the steps is determined from a codeword is generated by an disk controller and the drive signal is applied to a sled-based disk reader.

20. A drive signal generator, comprising:
a tap register storing patterns representing rows of Pascal's triangle and responsive to a control signal identifying a selected row;
a timing engine to drive the tap register at time intervals corresponding to a time constant $t_C$:

$$t_c \cong \frac{1}{2f_R}$$

where $f_R$ is an expected resonant frequency of a mechanical system to be driven by the drive signal generator; and
an accumulator, responsive to the tap register and to data representing a start position and a destination position of the mechanical system to generate a stepped drive signal, wherein:
a number of steps equals the number of entries from the selected row of Pascal's triangle,
each step has a step size corresponding to a difference between the start position and destination position and to a respective entry of the selected row of Pascal's triangle, and
the steps are spaced from each other according to the time constant $t_C$; and a digital to analog converter to generate an analog representation of the stepped drive signal.

21. The drive signal generator of claim 20, wherein the digital to analog converter generates an analog voltage.

22. The drive signal generator of claim 20, wherein the digital to analog converter generates an analog current.

23. The drive signal generator of claim 20, wherein the drive signal has substantially zero energy at the expected resonant frequency.

24. A drive signal generator, comprising:
a tap register storing patterns representing rows of Pascal's triangle, the patterns each containing intervals of a number of uniform steps, the number of intervals corresponding to the number of entries of Pascal's triangle, the number of steps in each interval corresponding to the value of a respective entry of Pascal's triangle;
an adder, responsive to output from the tap register and to data representing a start position and a destination position of the mechanical system to generate a stepped drive signal, wherein the stepped drive signal has an amplitude corresponding to an accumulated number of steps output from the tap register and further corresponding to a difference between a start position and a destination position,
a timing engine to drive the tap register, wherein the timing engine causes the tap register to output steps in intervals, the intervals are spaced from each other by a time constant $t_C$, by:

$$t_c \cong \frac{1}{2f_R}$$

where $f_R$ is an expected resonant frequency of the mechanical system, and steps within each interval are spaced from each other by a time constant shorter than $t_C$.

* * * * *